United States Patent Office 3,687,618
Patented Aug. 29, 1972

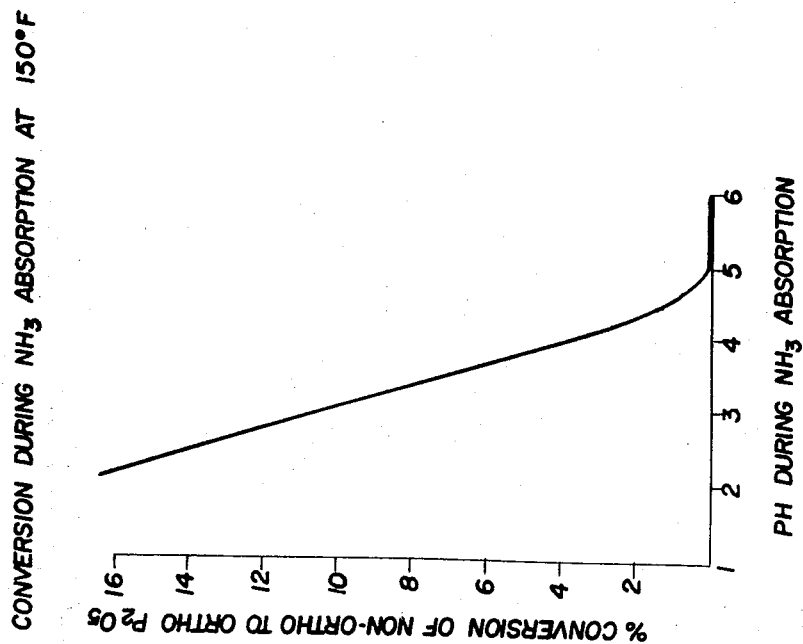
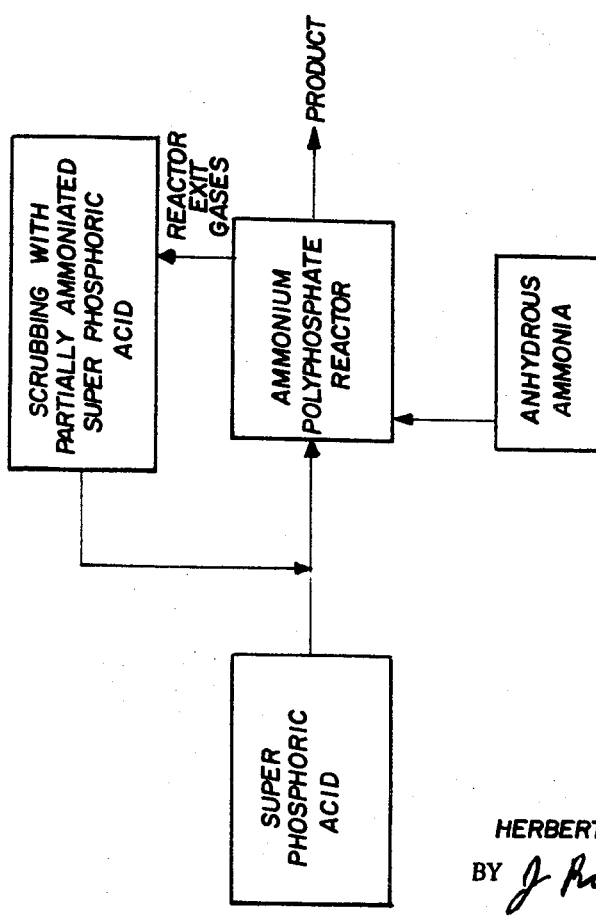

3,687,618
RECOVERY OF AMMONIA FROM EXIT GASES OF AN AMMONIUM POLYPHOSPHATE PLANT
Herbert J. Clausen, Apollo Beach, Fla., assignor to Cities Services Company, New York, N.Y.
Filed Dec. 22, 1970, Ser. No. 100,733
Int. Cl. C01b 25/28, 25/38
U.S. Cl. 423—314
4 Claims

ABSTRACT OF THE DISCLOSURE

Ammonia can be recovered from the exit gases of an ammonium polyphosphate plant by scrubbing the reactor exit gases with partially ammoniated superphosphoric acid having a pH above about 3, and recycling the product obtained thereby to the reactor. In this way the production of orthophosphate is minimized.

BACKGROUND OF THE INVENTION

Wet process phosphoric acid is manufactured by treating phosphate rock with sulfuric acid in order to form free phosphoric acid and calcium sulfate. The latter, being insoluble is separated from the acid by filtration. The wet process acid, as commonly produced and handled, is highly corrosive to mild steel at ambient temperatures and corrosive to most materials including stainless steels at elevated temperatures. As a result, precautions are necessary in shipping, such as the use of rubber or polyethylene lined containers and storing the phosphoric acid in lead, brick or rubber lined vessels. When such wet process acid is treated with ammonia to form aqueous ammonium phosphate solutions, the impurities present in the acid form gelatinous precipitates which are substantially impossible to separate from the aqueous phase by filtration or other conventional methods. Such precipitated impurities in no way interfere with the fertilizing value of the ammonium phosphate, although they settle in the bottom of storage vessels and clog pipe lines and the equipment used for applying the fertilizer to the soil.

Previous attempts to obtain aqueous solutions of ammonium phosphate from wet process phosphoric acid having generally been directed to the purification of the acid. These methods have not been widely accepted because they are complex and costly to perform. They also reduce the nutrient value of the product, since the precipitated impurities themselves are plant nutrients. Thus, because of the aforesaid problems and disadvantages, substantially all the ammonium phosphate produced from wet process phosphoric acid is applied to the soil as fertilizer in solid form. When polyphosphates are used, these impurities do not precipitate and a substantially clear liquid fertilizer can be produced. Additionally, polyphosphates are substantially completely water soluble and therefore are substantially completely available as fertilizer. It is therefore commercially advantageous to market the ammonium phosphate fertilizer in the polyphosphate form.

It has additionally been found that when super-phosphoric acid containing non-orthophosphates (polyphosphates) is diluted and thereafter ammoniated at a predetermined rate and a temperature below about 210°, the resulting product has a high percentage of polyphosphate. For example when concentrated superphosphoric acid is diluted and ammoniated at a temperature below about 210° F., the heat provided by the heat of neutralization of the ammoniation process process sufficient heat of evaporation so as to remove a major amount of the water, thereby resulting in a solid high analysis ammonium polyphosphate fertilizer material. In order to prevent hydrolysis of the polyphosphates present in superphosphoric acid to orthophosphoric acid during dilution, the concentrated superphosphoric acid is diluted just prior to ammoniation at a temperature and rate so as inhibit that hydrolysis.

In that manufacture of ammonium polyphosphates from concentrated superphosphoric acid at atmospheric pressure, the reactor exit gases, containing substantial quantities of ammonia, are either vented to the atmosphere or are recovered in a way which precludes their use in making additional ammonium polyphosphate fertilizer. This invention is directed to a method for recovering the ammonia present in reactor exit gases with the superphosphoric acid in such a way that the hydrolysis of polyphosphate to orthophosphate is minimized.

BRIEF DESCRIPTION OF THE DRAWINGS

FIG. 1 is a block diagram of this invention for producing high analysis ammonium polyphosphates showing the scrubbing of the reactor exit gases with partially ammoniated superphosphoric acid and recycle thereof.

FIG. 2 is a graph showing the increase in conversion of non-ortho $P_2O_5$ to ortho $P_2O_5$ with decreasing pH of the scrubbing solution.

DETAILED DESCRIPTION OF THE INVENTION

It has now been found that ammonia can be recovered from the reactor exit gases produced in a method for making ammonium polyphosphates by the ammonination of superphosphoric acid by scrubbing the reactor exit gases with partially ammoniated superphosphoric acid.

With reference to FIG. 1, wherein the process of this invention is shown in a flow diagram, the starting material is concentrated superphosphoric acid containing 60 to 85% by weight phosphorous, expressed as $P_2O_5$. The superphosphoric acid can be obtained in any convenient way such as by concentration of wet process acid or from furnace acid. The term superphosphoric acid as used defines a phosphoric acid containing substantial quantities of polyphosphoric and orthophosphoric acid. The polyphosphoric acids include pyrophosphoric acid, and the various polymeric acids varying from triple phosphoric acids to metaphosphoric acid and higher polyphosphates. In the practice of this invention it is desired that the concentrated superphosphoric acid contain as little orthophosphoric acid as possible in order to maximize the yield of ammonium polyphosphate.

To provide sufficient water so that the heat evolved during the ammoniation process is removed by the heat required for the evaporation of water, the superphosphoric acid can be diluted prior to ammoniation. Superphosphoric acid, however, tends to hydrolyze in water to the ortho form and it is therefore necessary to provide a method of preventing or inhibiting hydrolysis and consequent formation of orthophosphate. To this end, superphosphoric acid is conveniently diluted with water just prior to ammoniation and under conditions of rate and temperature to inhibit hydrolysis of a polyphosphate. In the preparation of ammonium polyphosphates a suitable range for dilution of the concentrated superphosphoric acid is in the range of from about 49% to about 60% (percent $P_2O_5$ by weight) superphosphoric acid. Undiluted superphosphoric acid having a concentration (expressed as percent by weight $P_2O_5$) from about 60% to about 80% can be used without dilution if desired. The superphosphoric acid, in convenient concentration, is continually cooled by conventional means to maintain a feed acid temperature of about 135° F.

The diluted superphosphoric acid is passed into the ammonium polyphosphate reactor; desirably, it is continuously sprayed therein.

Anhydrous ammonia is continuously passed into the ammonium polyphosphate reactor. Here, the ammonia gas is continuously and thoroughly mixed with the diluted superphosphoric acid to obtain the ammonium polyphosphate product. In a preferred embodiment, the quantity of water in the diluted superphosphoric acid can be such that it is sufficient to maintain the temperature of the reactor bed at a desired level, for example below about 180° F. while also being vaporized, thereby removing the heat of neutralization so as to yield a satisfactory dry ammonium polyphosphate product. The product is continuously removed while excess ammonia is vented along with the reactor exit gases.

As indicated, the reactor exit gases are scrubbed with partially ammoniated superphosphoric acid. The exit gases are desirably absorbed and scrubbed with the partially ammoniated superphosphoric acid under such conditions as to minimize the hydrolysis of the polyphosphate to orthophosphate. Thus, it has been found that when the partially ammoniated superphosphoric acid has a pH above about 3, and preferably between about 5 and 6, the hydrolysis of the polyphosphate to orthophosphate is significantly reduced. This can be seen from FIG. 2, where the conversion of non-ortho to ortho $P_2O_5$ is graphically represented as a function of decreasing pH. As can be seen from the graph, at pH below about 3 there is considerable hydrolysis. At a pH above about 6, the solution tends to become more alkaline and therefore is unable to absorb ammonia.

The scrubbing temperature is significant and is desirably maintained in the range of from about 100° to about 175° F. At lower temperatures there is a possibility of precipitating some polyphosphate material while if the temperature is increased significantly above 175° F. there are attendent corrosion problems and the hydrolysis of polyphosphate is increased. In a preferred embodiment, the temperature is maintained in the range of from about 140° to about 170° F., with superior results being obtained between 150° and 160° F.

The scrubbing solution can have any convenient concentration, but in a preferred embodiment the solution is diluted. Dilution is required to overcome problems of viscosity, concentrated superphosphoric acid being extremely viscous. In a preferred embodiment the acid is diluted to about 50% to about 60% ($P_2O_5$ by weight) to obtain a solution having a viscosity which is convenient to work with.

As indicated, the diluted superphosphoric acid is partially ammoniated. This can be done in any convenient way, the ammoniation advantageously being performed so as to provide a solution containing from about 5 to about 15% nitrogen by weight. In a preferred embodiment the acid is ammoniated to provide from about 5 to about 10% by weight of nitrogen. Typical solutions will have a composition such as 7-24-0 (N-P-K) and 13-44-0. At higher degrees of ammoniation, excess orthophosphate formation is obtained.

In a preferred embodiment the solution obtained upon scrubbing the reactor exit gases, which solution is characterized by a low orthophosphate content is recycled for reaction in the ammonium polyphosphate reactor.

Example I

This example illustrates the proposition that partially ammoniated superphosphoric acid can absorb ammonia without substantial conversion of non-ortho $P_2O_5$ to the ortho form.

Superphosphoric acid was ammoniated with 28% aqueous ammonia to give a 7-24-0 (N-P-K) on. The pH was maintained above 6.2 to prevent the non-ortho $P_2O_5$ from converting to the ortho form. Anhydrous ammonia was then passed through the 7-24-0 fertilizer solution to evaluate its ability to absorb ammonia. The pH was kept between 6.2 and 6.5 by the addition of superphosphoric acid. Temperature was maintained at between 150° and 160° F. A total of 99 parts of nitrogen was passed through the solution, 88 parts of which were absorbed by the solution.

In the course of the initial ammoniation it was found that 1.5% of the non-ortho $P_2O_5$ was converted to the ortho form and the solution absorbed 88.6% of the total nitrogen passed through it. During the ammonia absorption, 0.2% of the non-ortho $P_2O_5$ was converted to the ortho form.

Example II

This example illustrates the ammoniation of 54% superphosphoric acid. 2,252 parts of phosphoric acid were added gradually to 748 parts of aqueous ammonia to prepare a 54% acid. The pH was maintained above 6.2 by the addition of anhydrous ammonia gas. When all the acid had been added, the pH was allowed to drop to 6.2 and a sample taken. Anhydrous ammonia was again passed through the solution and a second sample taken when the pH reached 6.5. The rate of addition of superphosphoric acid was approximately 188 parts per hour, the anhydrous ammonia approximately 26 parts per hour. Temperature was maintained between 150° and 160° F. Approximately 3.0% of the non-ortho $P_2O_5$ was converted to the ortho form during the reaction.

Example III

Two fertilizer solutions having compositions 7-24-0 and 13-44-0 respectively were tested for their ability to absorb ammonia at pH 5.0, 5.5, and 6.2 at temperatures of 100° and 150° F.

Approximately 500 milliliters of fertilizer solution was used for each run. Ammonia was added at a rate of 0.1 gram per minute. The system was kept under slight vacuum and all effluent gases passed through a sulfuric acid trap. Superphosphoric acid was added as needed to maintain a constant pH. Water was added to keep the $P_2O_5$ concentration approximately constant. After the ammonia absorption, each solution was analyzed to determine total nitrogen absorbed, nitrogen not absorbed, and percent conversion of non-ortho $P_2O_5$ to ortho $P_2O_5$.

As will be seen below, the ammonia appeared to be absorbed completely by the 7-24-0 fertilizer solution under all test conditions. There was essentially no conversion of the non-ortho $P_2O_5$ to the ortho form. The 13-44-0 solution showed somewhat higher conversion of non-ortho $P_2O_5$ to the ortho form. The results are reported below and summarized in Table 1.

TABLE 1

| Sample | pH | Percent temp. | Final wt. | Percent Total $P_2O_5$ | Percent Non-ortho $P_2O_5$ | Percent Non-ortho/total | N | Total grams N | Grams N absorbed | Grams N in trap |
|---|---|---|---|---|---|---|---|---|---|---|
| 7-24-0 | | | 500.0 | 24.09 | 9.53 | 39.56 | 6.96 | 34.8 | | |
| A | 5.0 | 100 | 766.5 | 28.48 | 11.46 | 40.24 | 6.80 | 52.1 | 17.3 | 0.0 |
| B | 5.5 | 100 | 798.3 | 25.60 | 10.20 | 39.84 | 6.39 | 51.0 | 16.2 | 0.0 |
| C | 6.2 | 100 | 743.3 | 25.86 | 10.53 | 40.72 | 7.05 | 52.4 | 17.6 | 0.0 |
| D | 5.0 | 150 | 907.0 | 26.80 | 10.61 | 39.59 | 5.58 | 50.6 | 15.8 | 0.0 |
| E | 5.5 | 150 | 878.9 | 26.25 | 10.40 | 39.62 | 5.95 | 52.3 | 17.5 | 0.0 |
| F | 6.2 | 150 | 2,350.4 | 29.31 | 11.56 | 39.44 | 8.23 | 193.7 | 87.5 | 0.18 |
| 13-44-0 | | | 500 | 44.76 | 18.34 | 40.97 | 13.43 | 67.2 | | |
| G | 5.0 | 100 | 982.6 | 40.67 | 15.86 | 39.00 | 8.92 | 87.7 | 20.5 | 0.31 |
| H | 5.5 | 100 | 825.5 | 39.54 | 13.23 | 33.46 | 11.81 | 97.5 | 30.3 | 0.0 |
| J | 6.2 | 100 | 714.8 | 38.80 | 12.73 | 32.81 | 13.41 | 95.9 | 28.7 | 0.91 |
| K | 5.0 | 150 | 871.7 | 40.52 | 13.78 | 34.01 | 11.08 | 96.6 | 29.4 | 0.0 |
| L | 5.5 | 150 | 810.0 | 40.38 | 13.51 | 33.46 | 12.08 | 97.9 | 30.7 | 0.18 |
| M | 6.2 | 150 | 652.3 | 42.60 | 15.21 | 35.70 | 12.47 | 81.3 | 14.1 | 0.06 |

Example IV

This example illustrates the capacity of a 7-24-0 fertilizer solution to absorb ammonia at a pH of 2, 3, and 4 at a 150° F. without converting non-ortho $P_2O_5$ to the ortho form.

A fertilizer solution was prepared having an approximate composition of 7-24-0. 300 parts of fertilizer solution was employed in each test. The ammonia was added at a rate of 0.18 part per minute. Superphosphoric acid and water were added as necessary to maintain a constant pH and keep the percent $P_2O_5$ approximately constant. The ability of the solution to absorb ammonia was tested at pH 2.0, 3.0, 4.0 at a temperature of 150° F. Following ammoniation, solutions were analyzed for percent conversion of non-ortho $P_2O_5$ and percent nitrogen and the trap was analyzed for nitrogen. It was determined that the ammonia was completely absorbed in all three cases but increasing conversion of non-ortho $P_2O_5$ to ortho $P_2O_5$ occurred with decreasing pH as follows:

| pH: | Percent conversion to ortho form |
|---|---|
| 4.0 | 5.58 |
| 3.0 | 7.41 |
| 2.0 | 16.44 |

Example V

The procedure of Example IV was repeated using a 14-49-0 solution and the ability of this solution to absorb ammonia at pH 2.0, 3.0, 4.0 and 150° F. without converting non-ortho $P_2O_5$ was determined. Results are summarized below.

| pH: | Percent conversion to ortho form |
|---|---|
| 4.0 | 3.49 |
| 3.0 | 8.78 |
| 2.0 | 11.22 |

From the foregoing it can readily be seen that ammonia can be recovered from ammonium polyphosphate reactor exit gases by scrubbing with partially ammoniated superphosphoric acid, preferably at a pH above about 3 to obtain a resulting solution having low orthophosphate content.

Therefore, I claim:

1. In a method for making ammonium polyphosphates in a reaction zone by the ammoniation of superphosphoric acid with anhydrous ammonia under conditions adapted to minimize the formation of ammonium orthophosphates, an improvement for producing ammonium polyphosphate, said improvement comprising scrubbing the reactor exit gases from the reaction zone at a temperature of from about 100° F. to about 175° F. with partially ammoniated superphosphoric acid containing from about 5% to about 15% by weight of nitrogen and having a pH above about 3, and below about 6 and recycling the product obtained thereby to the reaction zone.

2. A method according to claim 1 in which the partially ammoniated superphosphoric acid has a pH between about 5 and 6.

3. A method according to claim 1 in which the superphosphoric acid is diluted to about 50 to 60% by weight $P_2O_5$ prior to scrubbing.

4. A method according to claim 1 in which the reaction zone exit gases are scrubbed with a solution comprising from about 5% to about 10% by weight nitrogen, from about 50% to about 60% by weight $P_2O_5$, having pH between about 5 and 6 at a temperature between about 140 and about 170° F., said scrubbing being characterized by the minimization of hydrolysis of polyphosphate to orthophosphate.

References Cited

UNITED STATES PATENTS

| | | | |
|---|---|---|---|
| 3,382,059 | 5/1968 | Getsinger | 71—34 |
| 3,562,778 | 2/1971 | Siegel et al. | 71—34 |
| 3,171,733 | 3/1965 | Hignett et al. | 71—48 |
| 3,192,013 | 6/1965 | Young | 23—165 |
| 3,310,371 | 3/1967 | Lutz | 23—107 |

OSCAR R. VERTIZ, Primary Examiner

G. A. HELLER, Assistant Examiner

U.S. Cl. X.R.

71—34, 43; 423—315